Jan. 21, 1969         W. A. KILMER                3,422,710
                    TURRET CONSTRUCTION
Filed Aug. 25, 1966                         Sheet 1 of 3
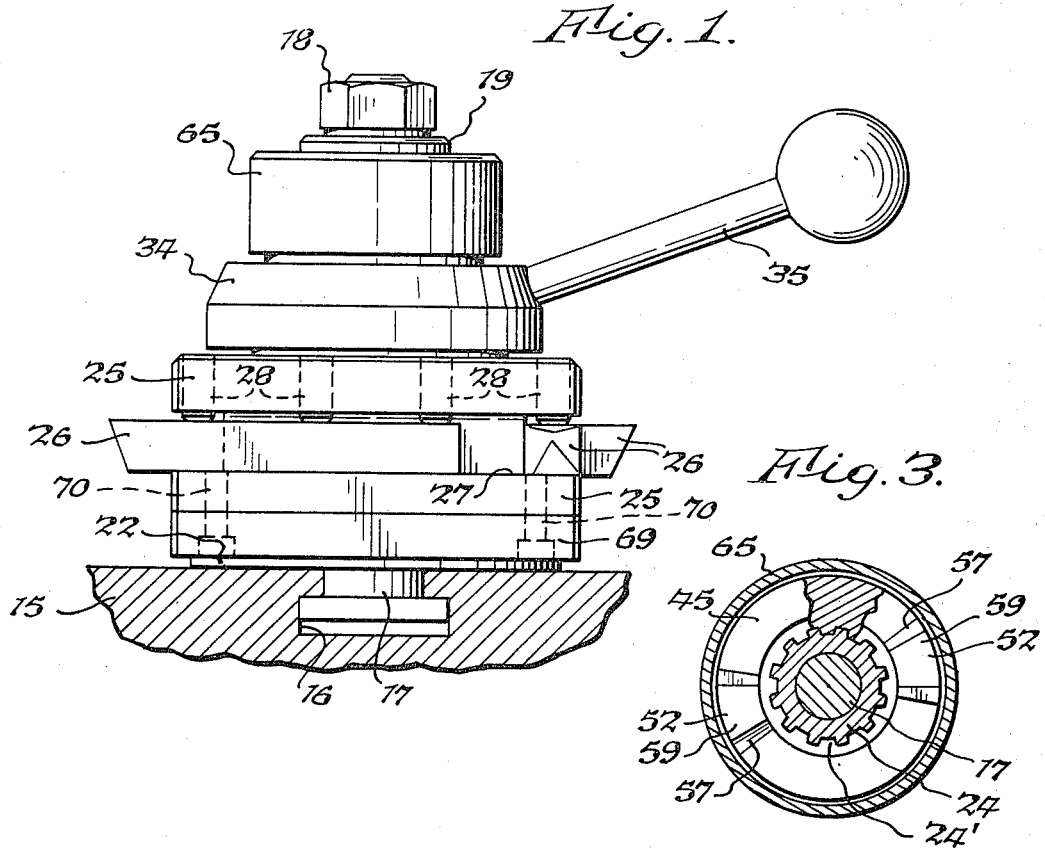
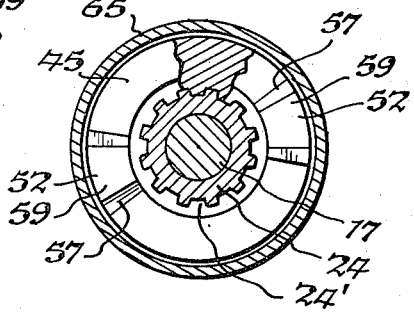
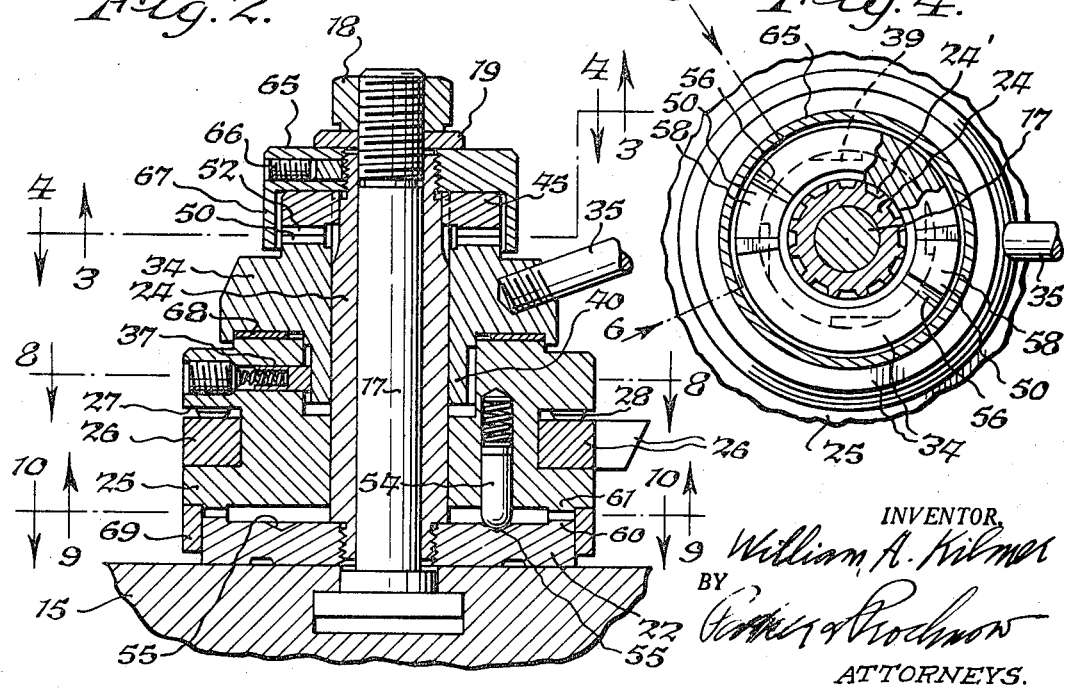
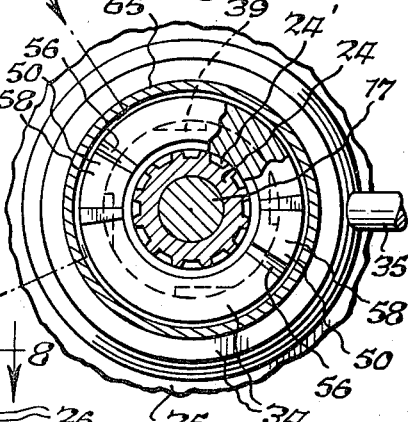
INVENTOR,
William A. Kilmer
BY
ATTORNEYS.

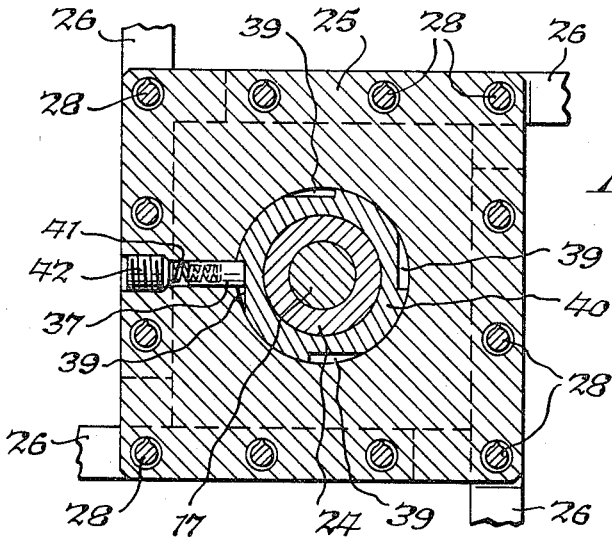
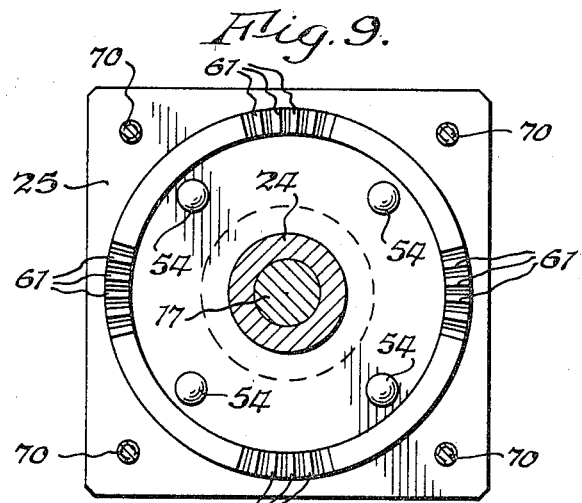
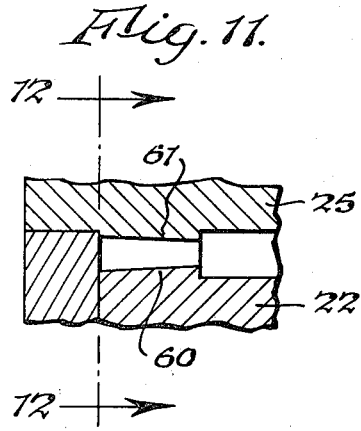
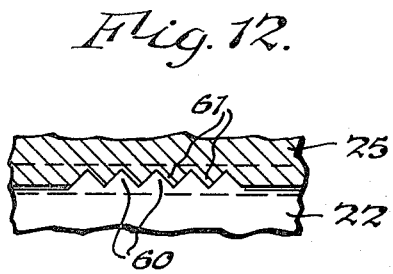
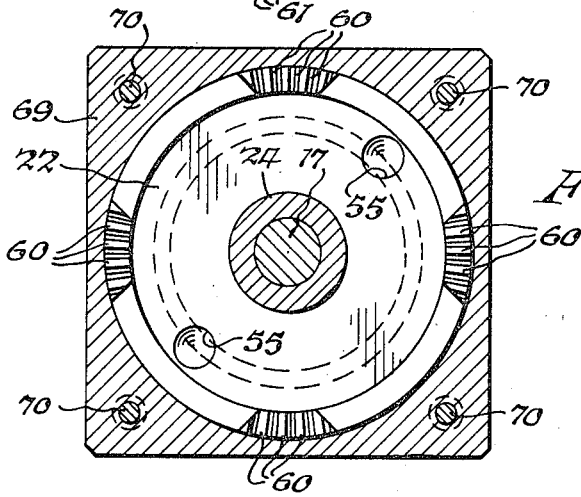

United States Patent Office 3,422,710
Patented Jan. 21, 1969

3,422,710
TURRET CONSTRUCTION
William A. Kilmer, Elmira, N.Y., assignor to Hardinge Brothers, Inc., Elmira, N.Y.
Filed Aug. 25, 1966, Ser. No. 575,083
U.S. Cl. 82—36
Int. Cl. B23b 29/28
2 Claims

ABSTRACT OF THE DISCLOSURE

This disclosure relates to turrets for use on machine tools for successively advancing different tools mounted thereon into an operative relation to the work, and to provide a turret construction in which the accuracy in which the turret is supported in different positions is improved.

---

This invention relates to turrets for use on machine tools for successively advancing different tools mounted thereon into an operative rotation to the work.

One of the objects of this invention is to provide a turret construction in which the accuracy in which the turret is supported in different positions is improved.

It is an object of this invention to provide a turret construction which retains its accuracy for long periods of time.

It is also an object of this invention to provide a turret positioning construction in which wear of the parts for a considerable length of time does not reduce the accuracy with which the turret is positioned for different cutting operations.

In the accompanying drawings:

FIG. 1 is an elevation of a turret embodying this invention.

FIG. 2 is a central, sectional elevation thereof.

FIGS. 3 and 4 are sectional views thereof on lines 3—3, FIG. 2, looking upwardly and on the same lines in FIG. 2, looking downwardly.

FIG. 8 is a sectional plan view thereof on line 8—8, FIG. 2.

FIG. 9 is a sectional view thereof on line 9—9, FIG. 2, looking upwardly.

FIG. 10 is a sectional view thereof taken on the line 10—10, FIG. 2 and looking downwardly.

FIG. 11 is a fragmentary, sectional view thereof on an enlarged scale showing a peripheral portion of the base and of the tool carrier with teeth in operative relation to each other.

FIG. 12 is a fragmentary, sectional view thereof on line 12—12, FIG. 11.

Figure 5:
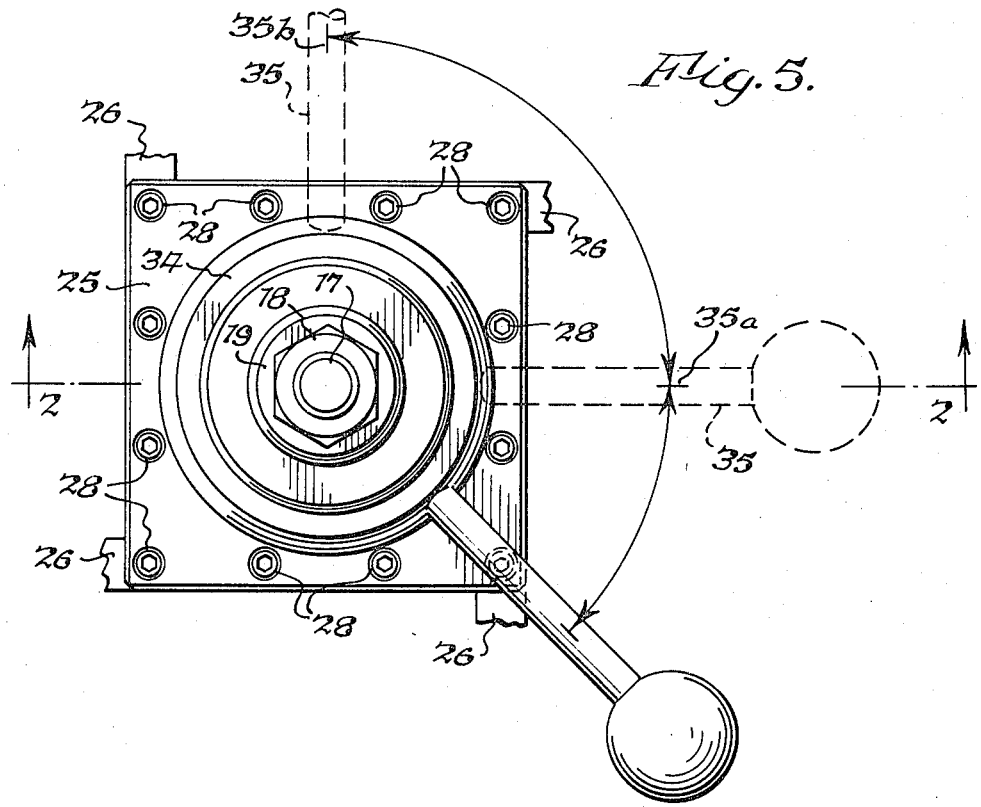
FIG. 5 is a top plan view thereof.

The turret may be suitably mounted on a part 15 of a lathe or other machine tool which has an undercut slot 16 in which a T-head of a tool post 17 is mounted and secured in locking position by means of a nut 18 and a disk 19. 22 represents a base resting upon the part 15 of the machine tool and having a screw threaded connection with a sleeve 24 extending about the post 17.

The turret includes a tool carrier 25 rotatably mounted on the sleeve 24. The tool carrier may be of any suitable construction for supporting tools 26 thereon. For example, the tool carrier may be of square shape having grooves 27 formed along its outer edges in which the tools 26 may be secured by means of clamping screws 28 or the like.

The advancing of the tool carrier from one position to another may be effected by means of a carrier advancing member 34 rotatably mounted on the sleeve 24 and movable by a lever 35 secured thereto. Rotation or indexing from the carrier advancing member 34 to the carriage 25 may be effected in any desired manner, for example, by means of a plunger 37 slidable in a hole formed in the carrier 25 and spring pressed into engagement with notches 39 formed on a downwardly extending cylindrical part or sleeve 40 of the carrier advancing member 34. The plunger may be pressed toward the carrier advancing member by a spring 41 pressing against the plunger. This spring is held in place by means of a screw 42. Consequently, when the carrier advancing member 34 is turned in a counterclockwise direction by means of the lever 35 when pushed away from the user, the carrier advancing member 34 will turn in a counterclockwise direction in FIG. 8 so that the notch 39 which is in engagement with the plunger 37, will turn the tool carrier in a counterclockwise direction in FIG. 8 to present another tool 26 to the work.

Figure 6:
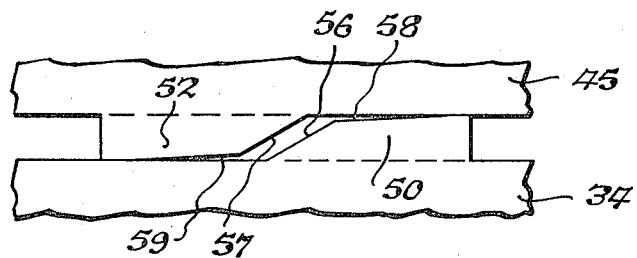
FIG. 6 is a fragmentary elevation taken on the line 6—6, FIG. 4.
Figure 7:
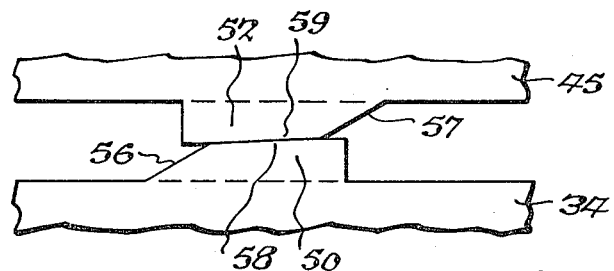
FIG. 7 is a similar view showing the same parts as in FIG. 6, but in different relative positions.

The tool carrying member is raised to permit it to be turned for indexing and lowered to lock it in correct position by means of cooperating cam surfaces provided on the upper surface of the carrier advancing member 34 and on a collar 45 keyed on the sleeve 24, as shown at 24' in FIGS. 2 and 3. These cam surfaces which are shown more in detail in FIGS. 4, 6 and 7, include a pair of cams 50 arranged on the upper face of the carriage advancing member 34, and a cooperating pair of cams 52 arranged on the lower face of the collar 45. As illustrated in FIGS. 6 and 7, it will be readily seen that when the carrier advancing member 34 is in the position shown in FIG. 6, the cams 50 and 52 are separated from each other so that the tool carrier 25 is raised upwardly by means of spring pressed plungers 54 mounted in apertures in the tool carrier 25 and bearing on the base 22, which preferably has indentations 55 thereon. When the two cams are out of engagement, as shown in FIG. 6, the spring plungers 54 will press the tool carrier upwardly and thus permit the tool carrier to be turned or indexed by turning the carrier advancing member through a part of a circle. This rotation of the tool carrier by means of the advancing member 34 is effected through the medium of the notches 39 and the spring pressed plunger 37 which will cause the tool carrier to be rotated for indexing the same. This indexing movement is effected by successive turning movements of the lever 35, first from a forward position shown in full lines in FIG. 5 to a position 35a shown in broken lines in FIG. 5. During this movement the cams 50 and 52 are turned from the position shown in FIG. 7 to that shown in FIG. 6. After completing this movement, the releasing of the two cams enables the spring plungers 54 to raise the tool carriage from the base so that the carrier can be turned. Upon further movement of the hand lever 35 to the position indicated at 35b, the carrier advancing member 34 is advanced through 90 degrees so that the tool carrier is advanced accordingly into a position in which a different tool 26 is presented to the work. Upon return movement from position 35b to the position shown in full lines in FIG. 5, the two cams 50 and 52 are moved into clamping position, shown in FIG. 7, in which the tool carrier member 25 is lowered against the spring action of plungers 54 into seating relation to the base 22.

The cams 50 and 52, as clearly shown in FIGS. 6 and 7, have the faces which engage with each other terminating in inclined ends 56 and 57 which ride upon each other when moved into clamping position so that the cam 52 is on top of the cam 50. In order to facilitate the final locking movement of these cams, the cam 50 has its upper surface 58 arranged at a slight inclination, such for example, as 4 degrees from the face of the carrier advancing member, and similarly the other cam 52 has its lower face 59 arranged at a similar angle to the upper face of the carrier advancing member 34. Consequently, by means of these two inclined faces, the two cam members can be more readily moved relatively to each other into their final clamping position, and out of this position The cams 50 and 52 serve to force the tool carrier 25 against the base 22 for holding the turret in its correct relation to the work to be cut. A high degree of accuracy in positioning the turret can be obtained by providing the base 22 with upwardly extending teeth 60 formed to mesh accurately with corresponding teeth 61 formed on the lower face of the tool carrier, as shown particularly in FIGS. 9 and 10. These teeth may be of any suitable shape so that the sides of the teeth 60 will fit snugly against the sides of the teeth 61. For this purpose, teeth with sides spaced 90 degrees from each other are best suited so that when the teeth are forced downwardly by the cams, both sides of each of the teeth 60 will fit into the sides of the teeth 61, and similarly the two sides of the teeth 61 will fit against both sides of the teeth 60. Consequently, when the lever 35 is in the position shown in full lines in FIG. 5, the teeth 61 in the tool carrier will be held down firmly in engagement with the teeth 60 of the base against the pressure of the spring plungers 54. The teeth 60 in the base determine the position of the turret and the repetitive accuracy obtained from the intermeshing of these teeth 60 and 61 will control the accuracy with which the turret will repeat after each indexing, and therefore the repetition of diameters turned by the tools on the work. These face type teeth have a centering action and since the faces of these teeth bear against each other, this centering action has a natural tendency to improve any repeatability as they wear so that they make the turret employing these teeth unusually accurate over a long period.

I have also provided an adjusting disk 65 having a screw threaded engagement with the sleeve 24. This disk can be adjusted about the sleeve 24 and secured in adjusted position by means of a set screw 66 so that the locking portions of the cam will mate properly at the same time that the base teeth 60 and 61 are solidly mated, which makes for accurate adjustment of the turret when making cuts.

The adjustment disk 65 is preferably provided with a downwardly extending flange or skirt 67 which extends about the cams to protect them against entry of foreign material, and I also provide a square-shaped plate 69 having a circular opening to receive the base 22 and is secured to the tool carrier 25 by means of cap screws 70, FIG. 10. It extends about the upper part of the base in position extending downwardly to protect the teeth 60 and 61 from foreign material. 68 represents a non-metallic washer between the carrier advancing member 34 and the tool carrier 25 for providing a lower friction bearing surface.

It will be understood that various changes in the details, materials and arrangements of parts which have been herein described and illustrated in order to explain the nature of the invention may be made by those skilled in the art within the principle and scope of the invention as expressed in the appended claims.

I claim:
1. A turret for use on a machine tool having a bed and a spindle,
   said turret including a base arranged in fixed relation to said bed,
   a tool post mounted on said bed and securing said base in fixed relation to the bed,
   a sleeve extending about said post and secured to said base,
   a tool carrier rotatable about said sleeve,
   a carrier advancing member also rotatable about said sleeve,
   a ratchet connection between said carrier and said advancing member,
   cam means interposed between said sleeve and said advancing member which urge said carrier into engagement with said base and which releases said carrier from engagement with said base,
   and resilient means which urge said carrier out of engagement with said base for indexing,
   said cam means being positioned to be actuated by said advancing member during a part of its movement and being disengaged from each other during movement of said advancing member to advance said carrier.

2. A turret according to claim 1 and including an adjustable connection between one of said cams and sleeve for setting said cams into correct relation to said carrier and base.

References Cited

UNITED STATES PATENTS

| 2,952,169 | 9/1960 | Johnson | 82—36 |
| 3,088,351 | 5/1963 | Schardt | 82—36 |
| 3,094,025 | 6/1963 | Diener | 82—36 |

FOREIGN PATENTS 825,168　12/1959　Great Britain.

LEONIDAS VLACHOS, *Primary Examiner.*

U.S. Cl. X.R.

74—813